A. A. REMINGTON & J. G. SWEENEY.
TWIN TIRE WHEEL RIM.
APPLICATION FILED JAN. 26, 1915.
1,174,350.
Patented Mar. 7, 1916.
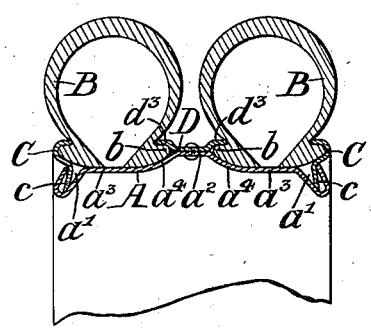
Inventors
Alfred Arnold Remington
Joseph George Sweeney.
By
Attorney.

UNITED STATES PATENT OFFICE.

ALFRED ARNOLD REMINGTON AND JOSEPH GEORGE SWEENEY, OF BIRMINGHAM, ENGLAND.

TWIN-TIRE-WHEEL RIM.

1,174,350.      Specification of Letters Patent.      Patented Mar. 7, 1916.

Application filed January 26, 1915. Serial No. 4,496.

*To all whom it may concern:*

Be it known that we, ALFRED ARNOLD REMINGTON and JOSEPH GEORGE SWEENEY, both subjects of the King of Great Britain, and both residing at Birmingham, in the county of Warwick, England, have invented certain new and useful Improvements in Twin-Tire-Wheel Rims, whereof the following is a specification.

This invention has for its object an improved construction of rim for a twin tire wheel.

A wheel rim constructed according to this invention is illustrated, in transverse section by the drawing herewith, which shows also two pneumatic tire covers in place therein.

A is the bed of the rim which is of the full width to receive both the tires and may be conveniently rolled of uniform thickness throughout. An outward bulge $a^2$ is formed during the process of rolling around the middle of the bed A, and the periphery of this bulge is cylindrical and the sides thereof curve into the cylindrical portions $a^3$ of the bed. A metal ring D, which may also be conveniently rolled of uniform thickness throughout, is riveted around the cylindrical portion of the bulge $a^2$ of the bed, and this ring is formed with sideway extensions $d^3$ which are of larger diameter than the middle portion of the ring and leave spaces between their inner surfaces and the portions $a^4$ of the bed which curve out at the sides of the central cylindrical portion $a^2$, these spaces receiving, respectively, the inner thickened or beaded edges of the tire covers or casings B. Within each edge of the bed A is formed a groove $a'$ to receive the flange $c$ of a split ring C which retains the outer bead of one of the tire covers B. Either tire may be removed independently of the other by first removing the corresponding ring C from its groove $a'$. The upper edge of the outer side of each groove $a'$ does not project beyond the cylindrical surface of the bed, and preferably, does not extend quite so far, thereby facilitating putting the tires in place and removing them.

We claim as our invention:

A twin tire wheel rim comprising a bed of the width required for both tires, said bed being bulged outwardly at its center and provided with inward grooves at its outer edges, a ring fixed to said outwardly bulged portion and provided with lateral extensions which lap over and retain the inner edges of the tires, and split rings disposed within said grooves and provided with flanges which retain the outer edges of the tires.

In witness whereof we have hereunto signed our names this 13th day of January, 1915, in the presence of two subscribing witnesses.

ALFRED ARNOLD REMINGTON.
    JOSEPH GEORGE SWEENEY.

Witnesses:
    ERNEST HARKER,
    ROBERT G. GROVES.